United States Patent [19]

Unger et al.

[11] Patent Number: 5,779,772
[45] Date of Patent: Jul. 14, 1998

[54] AIR DRYING CARTRIDGE FOR VEHICLES' COMPRESSED-AIR BRAKE SYSTEM

[75] Inventors: Hans Unger, Unterschleissheim; Wolfgang Hatz, Munich; Herbert Tschewik, Haimhausen, all of Germany

[73] Assignee: Knorr Bremse Systeme fur Nutzfahrzeuge GmbH, Munich, Germany

[21] Appl. No.: 646,295

[22] PCT Filed: May 6, 1994

[86] PCT No.: PCT/DE94/00531

§ 371 Date: May 16, 1996

§ 102(e) Date: May 16, 1996

[87] PCT Pub. No.: WO95/14598

PCT Pub. Date: Jun. 1, 1995

[30] Foreign Application Priority Data

Mar. 22, 1994 [DE] Germany .................... 44 09 871.5

[51] Int. Cl.[6] ................................................ B01D 53/26
[52] U.S. Cl. .................... 96/137; 55/DIG. 17; 96/138; 96/147; 96/149; 96/151
[58] Field of Search ................. 55/DIG. 17; 95/117; 96/135, 136, 137, 138, 147, 149, 151

[56] References Cited

U.S. PATENT DOCUMENTS

| | | | |
|---|---|---|---|
| 2,586,670 | 2/1952 | Lambertsen | 96/149 |
| 3,353,339 | 11/1967 | Walter | 96/137 |
| 3,796,025 | 3/1974 | Kasten | |
| 4,572,725 | 2/1986 | Kojima | 96/137 |
| 4,816,047 | 3/1989 | Neal | 96/137 |
| 5,286,282 | 2/1994 | Goodell et al. | 96/147 |
| 5,403,387 | 4/1995 | Flynn et al. | 96/149 |

FOREIGN PATENT DOCUMENTS

| | | |
|---|---|---|
| 0275201 A1 | 7/1988 | European Pat. Off. |
| 2126124 | 3/1984 | United Kingdom |

*Primary Examiner*—C. Scott Bushey
*Attorney, Agent, or Firm*—Barnes & Thornburg

[57] ABSTRACT

In a drying cartridge for air drying installations, especially for vehicle air-brake systems, an air drying agent is contained inside an outer pot, the base region of which can be closed off by a face cover. A central screw with a thread at its end passing through the face cover and securable to the dryer casing extends axially and centrally through the drying cartridge. The face cover, which may be made of thin plastic, can move to a limited extent in relation to the outer pot of the drying cartridge and is secured by clamping or friction to an O-ring which in turn is introduced into an annular groove in the central screw such that, after the drying cartridge has been released from the dryer casing, the cartridge can still be handled as a structural unit. All that is necessary to dispose of the filter and granulate material (drying agent) in the drying cartridge is to move the face cover inwards in relation to the outer pressure of the drying cartridge in order to release the frictional and clamping connection with the O-ring and then completely dismantle the individual components of the cartridge.

10 Claims, 1 Drawing Sheet

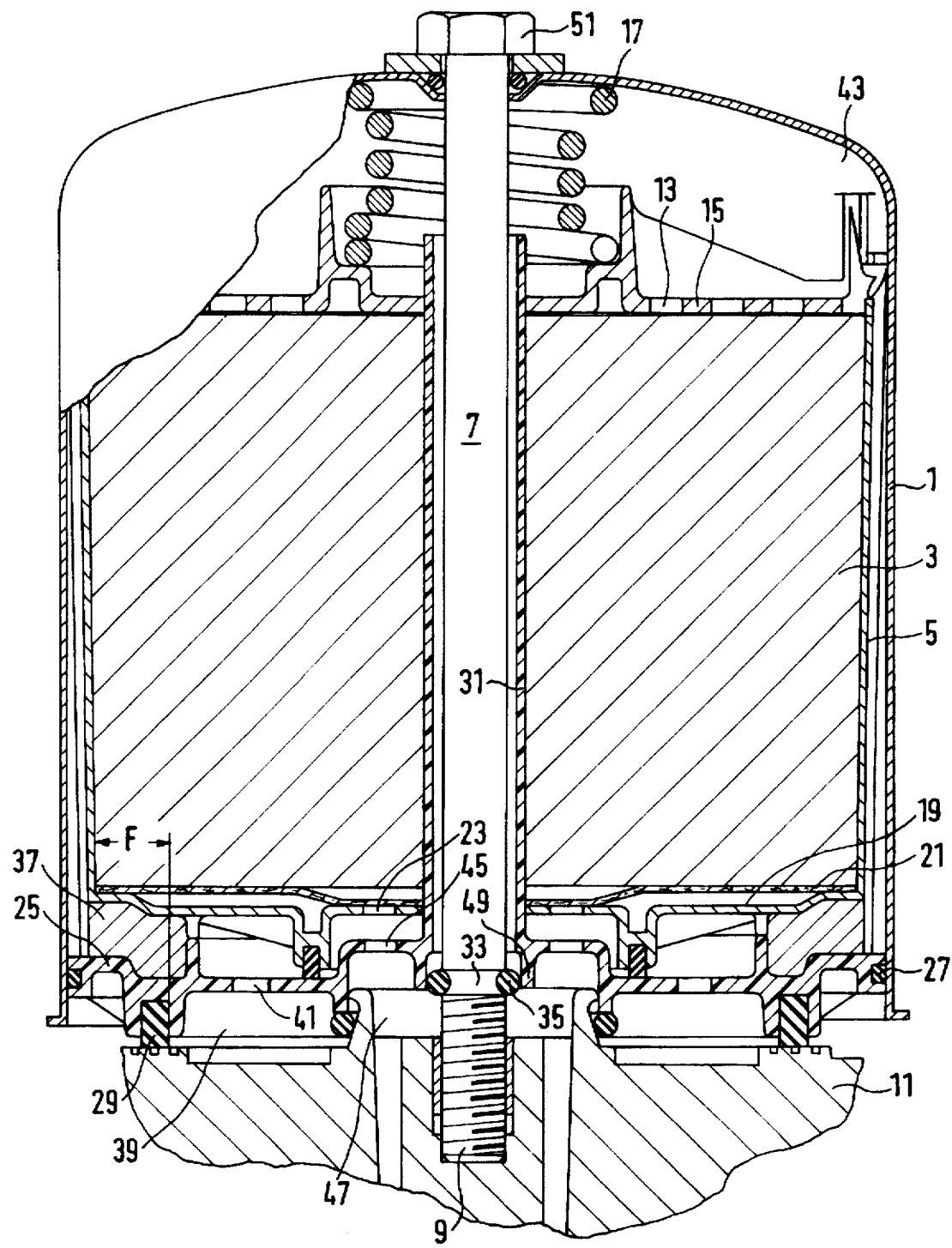

AIR DRYING CARTRIDGE FOR VEHICLES' COMPRESSED-AIR BRAKE SYSTEM

BACKGROUND AND SUMMARY OF THE INVENTION

The invention relates to a drying cartridge in general and more specifically, to an Air Drying Cartridge for Vehicles' Compressed-Air Brake Systems.

In the case of drying cartridges of the concerned type, which, according to their use, are called "disposable cartridges", a face cover is fastened to the underside of a pot, for example, by a flanged connection. The face cover having a thread in the center for fixing the cartridge on a dryer casing. Devices are provided which prevent escape of the granulates or drying agent through the center to the outside. Thus, the drying cartridge can be handled without special measures. That is, after being unscrewed from the dryer casing, it can be stored intermediately or be used as a disposable part. The face covers used for such drying cartridges or their flanged connections with the pot of the drying cartridge are considered to result in high expenditures with respect to the material and with respect to the thickness of the material. Because of the unreleasable flanged connection, a separate disposal of the filter material and the material of the granulates and the reuse of the other piece parts situated in the drying cartridge is possible only at disproportionately high expenditures. The drying cartridge can therefore only be used as a disposable part.

During the manufacturing of drying cartridges of the concerned type, the demands for an environmental compatibility which is as extensive as possible become increasingly important. Thus, because of the long-term effect of rust, it is undesirable to store contaminated drying cartridges, that is, drying cartridges enhanced with oil particles, in increased numbers as disposable parts and to take them to a waste dump.

Thus, it is an object of the invention to develop a drying cartridge of the concerned type with heightened environmental protection. In particular, it should be possible to carry out a low-cost disposal of the filter and granulate material situated in the drying cartridge without the requirement of carrying out time-consuming dismantling of the pot of the cartridge. On the other hand, it must be ensured that, after having been detached from the dryer casing, the drying cartridge can be handled as a structural unit without any escaping of filter material or granulate material from the interior of the cartridge.

These objects are achieved by a face cover releasably fastened to a central screw of the cartridge and displacable relative to the outside of the pot to allow releasing of the fastener assembly.

Despite the use of the face cover which can be displaced relative to the outside pot and is therefore releasably connected with the latter, it is possible to handle the drying cartridge as a structural unit separately from the dryer casing. On the other hand, as a result of the displaceability of the face cover, it is possible to release the connection consisting of the clamping or frictional fit with respect to the central screw of the cartridge so that, if required, it will be possible to remove all piece parts of the cartridge at low cost and therefore dispose of the filter material and of the granulates.

Advantageous developments and further developments are indicated in additional claims.

In the following, the invention is explained by means of an embodiment with reference to the single FIGURE.

BRIEF DESCRIPTION OF THE DRAWING

The FIGURE is a sectional view of the drying cartridge according to the principles of the present invention.

DETAILED DESCRIPTION OF THE PREFERRED EMBODIMENTS

A drying or filter cartridge according to the invention which is illustrated in the FIGURE, has an outer pot 1 in which an inner pot 5 is situated which contains a drying agent 3. A central screw 7 extends centrally through the drying cartridge and includes a threadable end 9 at its lower end for the screwed connection of the drying cartridge with the dryer casing 11 partially illustrated in the FIGURE. A cover 15, having openings 13, is at the top of the inside pot 5 and displaceable relative thereto. A pressure spring 17 operates between the outside pot 1 and the cover 15 such that the drying agent situated in the inside pot 5 can be compressed in a predetermined manner. The bottom 19 of the inside pot 5 carries a wire sieve 21 or a nonwoven element which prevents the drying agent from emerging through openings 23 perforating the bottom of the cartridge.

Below the bottom 19, a face cover 25 is situated which can be displaced in the outside pot 1 and is sealed off with respect to it by a ring packing 27. On the bottom side, the face cover 25 carries a packing ring 29, which may be constructed, for example, as a flat packing, and in the mounted condition of the drying cartridge has a sealing-off effect with respect to the facing face of the dryer casing 11.

Preferably, the face cover 25 is connected with a central tube 31 integral thereto. The central tube 31 extends centrally through the drying cartridge and receives the central screw 7. An O-ring 35 is inserted into an annular groove 33 machined at the lower end of the central screw 9. In the manner described in the following, the O-ring 35 holds together the drying cartridge when the drying cartridge is not mounted on the dryer casing 11.

Between the bottom 19 of the inside pot 5 and the face cover 25, a preliminary filter 37 of an annular shape is inserted in the exterior area. According to the representation in the drawing, the air to be dried enters by a connection (not shown) in the chamber 39 situated below the face cover 25. From there, the air passes through openings 41 situated in the face cover 25 and to the preliminary filter 37. After flowing out of the preliminary filter 37, the prefiltered air flows in the annular space between the outside pot 1 and the inside pot 5 in the upward direction into the chamber 43. From the chamber 43, the air flows downward through the openings 13 situated in the cover 15 and passes through the actual drying agent 3 of the cartridge. After passing through the openings 23 of the bottom 19 and through the openings 45 of the face cover 25, it arrives in chamber 47 from which it enters, by way of ducts, into the dryer casing for the purpose of being transmitted to a supply of pressure medium.

As mentioned above, the O-ring 35 holds the drying cartridge together unless the latter is mounted on the dryer casing 11. Furthermore, the O-ring 35 essentially has the task of separating dry and wet air since, within the annulus existing between the central screw 7 and the central tube 31, wet air enters from the chamber 43 and an absolutely effective seal is required with respect to the dry air existing in the chamber 47.

In order to achieve this, the O-ring 35 is held with sufficient prestressing between the annular groove 33 and a sleeve-shaped extension 49 situated on the lower end of the central tube 31. The O-ring 35 permits a slight relative movement between the face cover 25 and the outside pot 1 such that the O-ring 35 can be displaced inside the extension 49 from the position illustrated in a slightly upward direction when, by rotating of the screw head 51, the central screw 7 is detached from the dryer casing 11. During this detachment, the face cover 25 moves in a slightly downward direction relative to the outside pot 1, because the pressure spring 17 relaxes and the compression of the drying agent 3 is simultaneously released.

As mentioned above, after the detaching of the drying cartridge, this drying cartridge is held together as a whole by the sealing O-ring 35. The drying cartridge can be handled as a whole; that is, it is possible to subject it to a servicing, in which case it is possible to exchange the drying agent 3 and the preliminary filter 37 as well as to clean the inside of the pot. In order to reach the interior of the drying cartridge according to the invention, it is only necessary to displace the face cover 25 so far into the cartridge in the interior direction by the suitable tools until the O-ring 35 is released from its clamping or friction engagement with the extension 49 and can be lifted out of the annular groove 33 by suitable devices. It will then be possible to withdraw the central screw 7 from the drying cartridge from the top side, after which the face cover 25, the preliminary filter 37 and the inside pot 5 are taken out of the drying cartridge from the bottom side. The preliminary filter 37 and the drying agent 3 may be disposed of, while the other piece parts of the drying cartridge can be reused after a possible required cleaning.

The force required for fastening the drying cartridge on the dryer casing 11 is ensured by the screwed connection of the central screw 7 with the dryer casing 11 by the thread engagement of the threaded end 9. For this reason, the face cover 25 may be dimensioned to be comparatively weak and may consist of plastic which is particularly advantageous in comparison to conventional cartridges in the case of which the fastening takes place by the thread engagement on the face cover 25 itself. The idea according to the invention of the detachable fastening of the face cover 25 on the cartridge is also implemented in the case of a different type of construction of the inside pot. The sealing effect of the cartridge with respect to the dryer casing 11 is achieved by the contact pressure by the pressure spring 17 with a screwed connected by means of the central screw 7. Another increase of the sealing effect is achieved in that the internal pressure existing in the drying cartridge acts in the downward direction on the differential annular surface marked by an F in the FIGURE. In this manner, an increased contact pressure of the packing ring 29 with respect to the dryer casing 11 can be achieved. The holding force of the O-ring 35 with respect to the central tube 31 or its extension 49 is completely sufficient if the hardness of the rubber material selected for the O-ring 35 is sufficient. That is, after the detachment from the dryer casing 11, the drying cartridge can be transported as a unit which can be handled and the drying cartridge can be subjected to a further processing or to a servicing.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Drying cartridge for air drying installations including a drying cartridge sealably mounted to a dryer casing, the drying cartridge comprising:

an outside pot, an inside pot in said outside pot and a drying agent in the inside pot;

a central screw extending through the drying cartridge and including a threaded end for threadably fastening the drying cartridge to the dryer casing;

a face cover displaceably mounted on the central screw adjacent a bottom side of the inside pot for sealing with the dryer casing when the drying cartridge is mounted to the dryer casing;

a central tube on the face cover and including an extension extending from a bottom side of the face cover;

the central screw extends through the center tube and includes an annular groove in the area of the passage of the central screw through the plane of the face cover;

a fastening arrangement including an O-ring in the annular groove of the central screw and displaceably held by the extension of the central tube for retaining the face cover on the central screw so as to maintain the inside pot and drying agent in said outside pot;

when the drying cartridge is dismounted from the dryer casing, displacement of the face cover permits a detaching of the O-ring of the fastening arrangement followed by a removal of the inside pot and drying agent from the interior of the drying cartridge.

2. Drying cartridge for air drying installations including a drying cartridge sealably mounted to a dryer casing, the drying cartridge comprising:

an outside pot, an inside pot in said outside pot and a drying agent in the inside pot;

a central screw extending through the drying cartridge and including a threaded end for threadably fastening the drying cartridge to the dryer casing;

a face cover displaceably mounted on the central screw adjacent a bottom side of the inside pot for sealing with the dryer casing when the drying cartridge is mounted to the dryer casing;

a fastening arrangement for retaining the face cover on the central screw so as to maintain the inside pot and drying agent in said outside pot;

when the drying cartridge is dismounted from the dryer casing, displacement of the face cover permits a detaching of the fastening arrangement followed by a removal of the inside pot and drying agent from the interior of the drying cartridge.

3. Drying cartridge according to claim 2 wherein the fastening arrangement includes a friction fit between the face cover and the central screw which can be released under applied pressure.

4. Drying cartridge according to claim 3, wherein the face cover is sealed and displaceable to a limited extent with respect to the interior circumference of the outside pot and, in the center, carries a central tube through which the central screw extends; and an end of the central screw opposite the threaded end includes a head outside the outside pot by which the threaded end can be screwed to the dryer casing.

5. Drying cartridge according to claim 4, wherein the face cover has openings for entering of air to be dried and openings for exiting of dried air; and including a packing ring, which acts with respect to the dryer casing, inserted on a bottom side of the face cover.

6. Drying cartridge according to claim 2, wherein the face cover consists of plastic.

7. Drying cartridge according to claim 2, wherein the face cover is sealed and displaceable to a limited extent with respect to the interior circumference of the outside pot and, in the center, carries a central tube through which the central screw extends; and an end of the central screw opposite the threaded end includes a head outside the outside pot by which the threaded end can be screwed to the dryer casing.

8. Drying cartridge according to claim 7, wherein:

the central tube includes an extension extending from a bottom side of the face cover;

the central screw includes an annular groove in the area of the passage of the central screw through the plane of the face cover; and the fastening arrangement includes an O-ring in the annular groove of the central screw and displaceably held by a friction fit in the extension of the central tube.

9. Drying cartridge according to claim 2, wherein the face cover has openings for entering of air to be dried and openings for exiting of dried air; and including a packing ring, which acts with respect to the dryer casing, inserted on a bottom side of the face cover.

10. Drying cartridge according to claim 2, including a spring in said drying cartridge for biasing said face cover toward said fastening arrangement.

* * * * *